3,327,343
AXLE BOLT AND SUPPORT ASSEMBLY
FOR CASTERS
David W. Thresher and John Chopyk, Palmer, Mass., assignors to United Service Equipment Co., Inc., Palmer, Mass., a corporation of Delaware
Filed Sept. 8, 1965, Ser. No. 485,767
4 Claims. (Cl. 16—40)

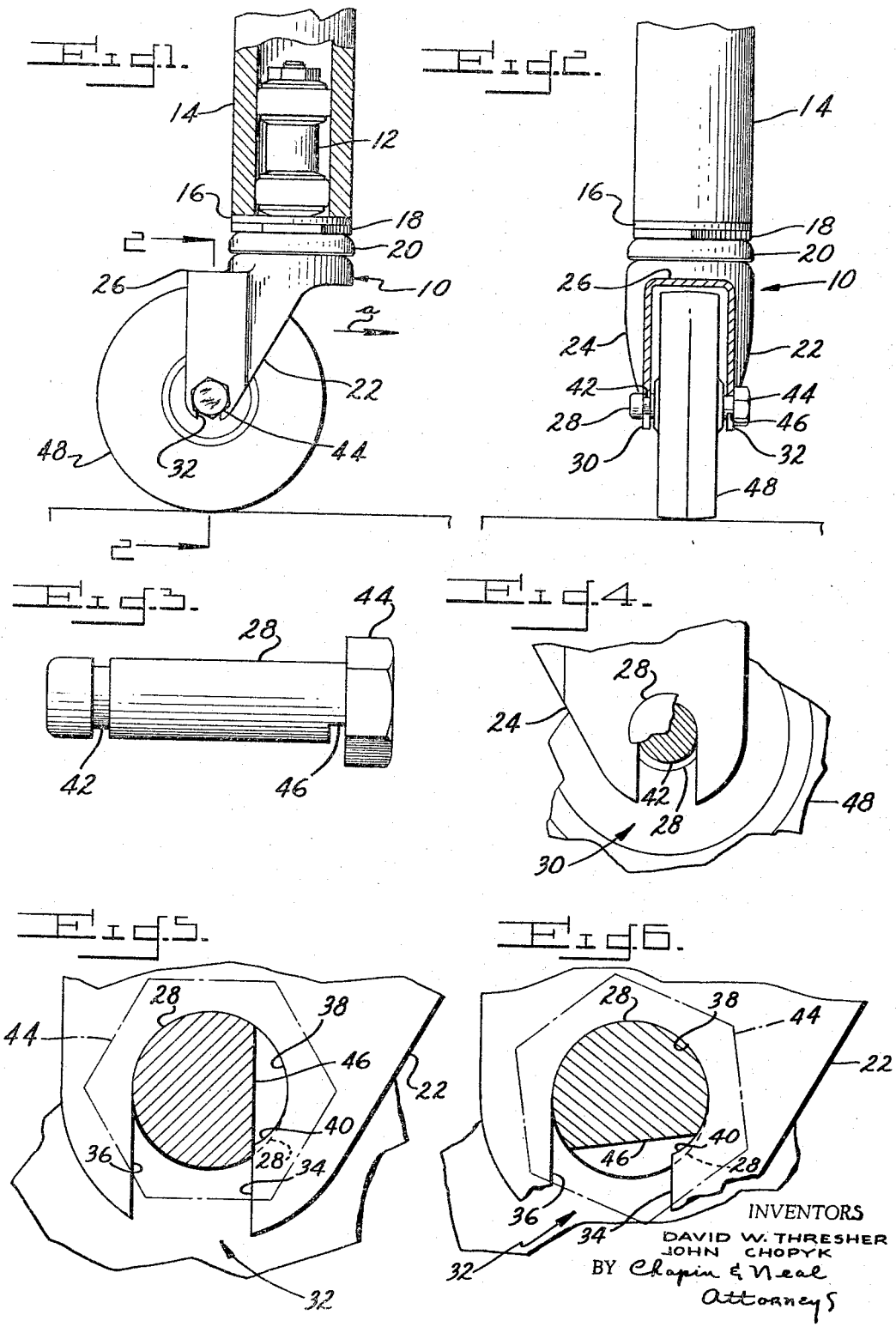

This invention relates to caster constructions and in particular to an axle and fork assembly for supporting the caster wheel.

An object of the invention is to provide an inexpensive simplified caster construction in which the wheel and axle may be quickly and readily assembled or disassembled with respect to its supporting fork member and without the use of the usual nuts, retaining rings or other fastening devices. Thus economies are obtained initially in the manufacture and cost of the same, and in later maintaining the caster for trouble-free operation.

These and other related objects and advantages will become apparent from the following description of the invention in conjunction with the accompanying drawings showing an embodiment thereof.

In the drawings:

FIG. 1 is a side elevation of a caster embodying the invention and shown affixed in the leg of a wheeled unit to be supported by casters;

FIG. 2 is a view on line 2—2 of FIG. 1;

FIG. 3 is an elevational view of an axle bolt of the assembly shown by FIGS. 1 and 2;

FIG. 4 is a fragmentary view of one end of the axle bolt and connection thereof with the associated fork member;

FIG. 5 is a fragmentary view of an enlarged scale of the other end of the axle bolt and connection thereof with the other fork member, the inserted position of the bolt being prior to rotation to "locked" condition; and FIG. 6 is a view similar to FIG. 5 and illustrating a "locked" condition.

Referring to FIGS. 1 and 2, the swivel caster shown embodying the present invention is basically of standard construction. A horn 10 is provided with a rotatably mounted applicator stem 12 of a conventional type in the leg 14 of a unit to be supported by the caster. A washer 16 and applicator nut 18 are shown at the base of the leg 14 with an upper ball race cup 20 at the top of horn 10. Arms 22 and 24 extend downwardly and diagonally from the horn 10 to form a forked structure with a top wall or horn shoulder at 26.

As thus far described this representative arrangement of parts of the caster is generally old in the art. The present invention is directed to the axle bolt and means for receiving same by the caster fork.

It will be observed in the drawings, that unlike the usual caster with holes in the ends of the arms for supporting an axle, two slots 30 and 32 are provided in the arms to receive a bolt 28 constructed in accordance with the invention.

The slot 30 of the arm 24 at the left in FIG. 2, and on the far side of FIG. 1, is in the form of an inverted U-shaped slot (see FIG. 4). The right slot 32 of the arm 22 at the right in FIG. 2 has an entrance section with generally parallel front and rear walls and an inner offset section (see FIG. 5).

In the preferred embodiment the slot 32 (FIG. 5) is shown with its front and rear parallel entrance walls at 34 and 36 respectively, the inner section designated as a whole by numeral 38 being generally in the shape of a forwardly offset circular portion having a cam surface at 40. In this connection it will be noted from FIG. 1 that the forward direction of travel of the caster as indicated by the arrow $a$ is with the arms angled in a trailing fashion. Thus, as shown by FIG. 5, the offset of the inner section is in a forward direction (relative to the travel) and the walls 34 and 36 are designated as front and rear walls respectively of the slot 32.

It may also be noted that rear wall 36 extends inwardly beyond front wall 34 before merging into the arcuate curvature of the inner section 38. This inner extension of wall 36 is a continuation of its entrance portion which faces wall 34. It also lies in a tangential relation to the circular arc of section 38, the axis of which is offset forwardly of a longitudinal center line between walls 34 and 36. As will be apparent for purposes to be later described in detail the upper half of section 38 is formed as a semicircle starting at the end of wall 36 and directed forwardly to form the upper offset portion lying forwardly of wall 34. At this forward end the upper semi-circular arc merges into a lower forward portion which is formed as a continuation of said arc but is radially inwardly directed thus constituting a rising cam surface to receive the axle bolt as will be described. This cam surface at 40 terminates as shown herein at the inner end of the entrance wall 34.

As will be readily appreciated from FIG. 5 which shows the axle bolt inserted into the slot before locking the same (as illustrated by FIG. 6) the entrance walls are spaced to allow the snug passage of the bolt across a chordal flat formed in one end thereof. And the semi-circular inner end wall of section 38 is formed to embrace and rotatably receive the cylindrical wall portion of the axle bolt as will now be described.

The axle bolt 28 for carrying wheel or roller 48 between arms 22 and 24, as clearly shown by FIG. 3, is formed to engage slots 30 and 32 in a particular manner. At one end of the bolt 28 is an annular groove 42. At the other end of the bolt 28 and at a position adjacent to the head 44 thereof is a flat 46.

The assembly and disassembly of the bolt is extremely quick and easy. First, the bolt 28 is inserted into the wheel 48. Then the bolt with the groove 42 and flat 46 aligned with the slots 30 and 32 respectively is inserted to its innermost position. This insertion in slot 30 is shown by FIG. 4 and in slot 32 by FIG. 5.

After the axle bolt 28 has been properly inserted into these slots 30 and 32, the bolt 28 is rotated approximately 90° in a clockwise direction in relation to the forward directional movement of the caster. This rotation locks the bolt in place by a wedging action. The wedging action is provided by the engagement of the outside diameter of the bolt 28 with the cam surface 40 of the inner section 38 of the slot 32 (FIGS. 5 and 6). The cam surface 40 as will readily be seen will jam the bolt against the opposite side of the inner section. As the entrance of the slot 32 is dimensionally smaller than the diameter of the axle bolt 28 and the flat 46 is not aligned therewith, the bolt will stay in place.

As shown in FIGS. 1, 5 and 6 and described above, the locking cam surface 40 in the slot 32 is located in the forward direction of travel of the caster. As the rotation of the wheel 48 on the axle bolt 28 is always in the clockwise direction, there is a definite tendency to rotate the axle bolt 28 in the forward or tightening direction. Consequently, the possibility of the axle bolt 28 backing off or falling out is substantially eliminated should the unit be lifted off a rolling surface.

It should be noted that while the cam surface 40 is formed at the lower forward portion of the circular offset in the preferred embodiment shown, the cam surface may be located at any point along a segment of the said offset forwardly of the wall 34.

While the invention has been shown and described as applied to a swivel type caster, it is also applicable to a rigid type caster. While it will be recognized that the direction of travel in a rigid type caster will not invariably serve to additionally tighten the locking feature, the axle bolt will not back off unless the coefficient of friction between the wheel bearing and axle bolt is greater than the coefficient of friction between the axle bolt and the fork. Since wheel bearings are invariably made from a material with a lower coefficient of friction than the material of the fork no serious problem will exist with the effective locking action in the offset slot. It will further be appreciated that a properly toleranced snug fit between the fork and the axle bolt provides additional assurance in securing the bolt assembly.

Although the invention has been particularly shown and described, it is contemplated that various changes or modifications may be made without departing from the scope thereof as indicated by the following claims.

We claim:

1. In a caster having a wheel fork with a pair of depending arms, an axle bolt and support assembly comprising a pair of arms with open ended slotted portions disposed therein and an axle bolt having its ends slidably insertable in said slots and rotatable to a wedged locking position therein, said axle bolt being a headed shaft provided with an annular groove adjacent one end and a chordally disposed flat adjacent its other end, the slotted portion of one of said arms having generally parallel walls spaced to receive the annular groove of the axle bolt, the slotted portion of the other of said arms having an entrance section with generally parallel walls spaced to receive said bolt across said flat, said slotted portion also having an inner section with the major part thereof being in the form of an offset circle, said offset circle having a segment thereof positioned laterally of one of said walls, said segment having an inwardly directed arcuately rising cam surface disposed thereon, whereby said axle bolt may be rotated when fully inserted in said slot, and when so rotated the surface of said axle bolt will engage said cam surface to wedge the bolt in the inner section of the slot.

2. In a swivel caster having a wheel fork with a pair of angularly directed depending arms, an axle bolt and support assembly comprising a pair of arms with vertically disposed open ended slotted portions in the lower end edges thereof and an axle bolt having its ends slidably insertable in said slots and rotatable to a wedged holding position therein, said axle bolt being a headed shaft with an annular groove adjacent one end and a chordally disposed flat adjacent its other end, the slotted portion of one of said arms having generally parallel front and rear walls spaced to receive the annular groove of said axle bolt, the slotted portion of the other of said arms having an entrance section with generally parallel front and rear walls spaced to receive said bolt across said flat, said slotted portion also having an inner section with the major part thereof being in the form of an offset semi-circle extending forwardly of the front wall of said entrance section, said semi-circular part merging into an arcuately rising cam surface extending radially inwardly of said inner section and terminating at the inner end of said front entrance wall, said flat at its lower edge on said axle bolt when fully inserted in said slot engaging the terminal edge of said cam surface, whereby said axle bolt may be rotated only in a forward direction and when so rotated the surface of said axle bolt will engage said cam surface to wedge the bolt in said inner section of the slot.

3. In a swivel caster having a wheel fork with a pair of angularly directed depending arms an axle bolt and support assembly comprising a pair of arms with vertically disposed open ended slotted portions in the lower end edges thereof and an axle bolt having its ends slidably insertable in said slots and rotatable to a wedged holding position therein, said axle bolt having an annular groove on one end thereof and a head on the other end thereof with a chordally disposed flat adjacent said head, the slotted portion of one of said arms having parallel front and rear walls spaced to slidably receive the annular groove of said axle bolt, the slotted portion of the other of said arms having an entrance section with parallel front and rear walls spaced to slidably receive said axle bolt across said flat, said slotted portion also having an inner section with the major part thereof being in the form of an offset circle extending forwardly of the front wall of said entrance section, an arcuately rising cam surface forwardly of the front wall of said entrance section on said circular part whereby said axle bolt when fully inserted in said slot may be rotated in a forward direction and when so rotated the surface of said axle bolt will engage said cam surface to wedge the bolt in said inner section of the slot.

4. In a swivel caster having a wheel fork with a pair of angularly directed depending arms, an axle bolt and support assembly comprising a pair of arms with vertically disposed open ended slotted portions in the lower end edges thereof and a cylindrical axle bolt having its ends slidably insertable in said slots and rotatable to a wedged holding position therein, said axle bolt having an annular groove on one end thereof and a head on the other end thereof with a chordally disposed flat adjacent said head, the slotted portion of one of said arms having parallel front and rear walls spaced to slidably receive the annular groove of said axle bolt, the slotted portion of the other of said arms having an entrance section with parallel front and rear walls spaced to slidably receive said axle bolt across said flat, said slotted portion also having an inner section with the major part thereof being in the form of an offset semi-circle extending forwardly of the front wall of said entrance section, said semi-circular part merging into an arcuately rising cam surface extending radially inwardly of said inner section and terminating at the inner end of said front entrance walls, said flat at its lower edge on said axle bolt when fully inserted in said slot engaging the terminal edge of said cam surfaces, whereby said axle bolt may be rotated only in a forward direction and when so rotated the surface of said axle bolt will engage said cam surface to wedge the bolt in said inner section of the slot.

References Cited

UNITED STATES PATENTS

| | | | |
|---|---|---|---|
| 1,900,672 | 3/1933 | Uhl | 16—18 |
| 3,204,285 | 9/1965 | Butsch | 16—40 |

MARVIN A. CHAMPION, *Primary Examiner.*

D. L. TROUTMAN, *Assistant Examiner.*